United States Patent [19]
Doherty

[11] Patent Number: 5,341,836
[45] Date of Patent: Aug. 30, 1994

[54] HANDS FREE WEED & FEED

[76] Inventor: Terrance M. Doherty, 4621 S. 84th St., Greenfield, Wis. 53228

[21] Appl. No.: 69,735

[22] Filed: Jun. 1, 1993

[51] Int. Cl.⁵ ............................................. B01F 5/04
[52] U.S. Cl. .................................. 137/268; 137/893; 239/318; 422/277; 422/283
[58] Field of Search ............... 137/603, 888, 893, 268; 239/316, 318; 422/277, 283

[56] References Cited

U.S. PATENT DOCUMENTS

| | | | |
|---|---|---|---|
| 1,518,999 | 12/1924 | Miller | 137/893 X |
| 1,681,308 | 8/1928 | Parker | 137/268 X |
| 2,039,275 | 4/1936 | McGrael | 239/318 X |
| 2,302,799 | 11/1942 | Peterson | 137/893 X |
| 2,381,589 | 8/1945 | Hayes | 239/318 X |
| 2,785,012 | 3/1957 | Frewin | 137/893 X |
| 3,333,601 | 8/1967 | Lofgreen | 137/893 X |
| 3,791,410 | 2/1974 | Sapiano | 137/893 |
| 3,829,023 | 8/1974 | Bouillard | 239/318 |
| 4,530,666 | 9/1982 | Klutts | 137/268 X |

FOREIGN PATENT DOCUMENTS 2486827  1/1982  France ........................ 239/318

Primary Examiner—Robert G. Nilson
Attorney, Agent, or Firm—Hugh E. Smith

[57] ABSTRACT

A liquid fertilizer dispensing device comprising a container adapted to hold liquid fertilizer solution; means at the top thereof to connect to a water faucet and to dispense a stream of water therefrom; feeder tube means extending from the interior base of said container to a point adjacent the stream of water passing through said top means so that the venturi effect of the passing stream of water will suck the fertilizer solution up through said feeder tube means and inject the same into the passing stream of water; valve means to adjust and control the rate of flow of said fertilizer solution into and through said feeder tube means; and preferably additional means to constantly indicate the level of fertilizer solution within said container and to permit the addition of more solution or granulated fertilizer to said container.

3 Claims, 3 Drawing Sheets

HANDS FREE WEED & FEED

BACKGROUND OF THE INVENTION

1. Field of the Invention

The present invention relates to fertilizer dispenser and more particularly pertains to such dispensers which may be used with liquid fertilizer on an adjustable automatic basis.

2. Description of the Prior Art

The use of liquid fertilizer dispensers is known in the prior art. More specifically, such dispensers heretofore devised and utilized for the purpose of dispensing liquid fertilizer are known to consist basically of familiar, expected and obvious structural configurations, notwithstanding the myriad of designs encompassed by the crowded prior art which have been developed for the fulfillment of countless objectives and requirements. Typical of such devices are those shown in U.S. Letters Pat. Nos. 5,005,601; 3,658,211; 4,995,418; 4,957,134; 4,870,991; and 4,033,509. These relatively complicated devices are not suitable for the average homeowner to conveniently use.

In this respect, the device according to the present invention substantially departs from the conventional concepts and designs of the prior art, and in so doing provides an apparatus primarily developed for the purpose of use by the average home owner or gardener.

Therefore, it can be appreciated that there exists a continuing need for new and improved liquid fertilizer dispensers which can be used by the average consumer. In this regard, the present invention substantially fulfills this need.

SUMMARY OF THE INVENTION

In view of the foregoing disadvantages inherent in the known types of liquid fertilizer dispensers now present in the prior art, the present invention provides an improved dispenser construction wherein the same can be utilized without difficulty by an average homeowner. As such, the general purpose of the present invention, which will be described subsequently in greater detail, is to provide a new and improved liquid fertilizer dispenser apparatus which has all the advantages of the prior art dispensers and none of the disadvantages.

To attain this, the present invention essentially relates to a liquid fertilizer dispensing device comprising a container adapted to hold liquid fertilizer solution; means at the top thereof to connect to a water faucet and to dispense a stream of water therefrom; feeder tube means extending from the interior base of said container to a point adjacent the stream of water passing through said top means so that the venturi effect of the passing stream of water will suck the fertilizer solution up through said feeder tube means and inject the same into the passing stream of water; valve means to adjust and control the rate of flow of said fertilizer solution into and through said feeder tube means; and preferably additional means to constantly indicate the level of fertilizer solution within said container and to permit the addition of more solution or granulated fertilizer to said container.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved liquid fertilizer dispenser which has all the advantages of the prior art devices and none of the disadvantages.

It is another object of the present invention to provide a new and improved liquid fertilizer dispenser which may be easily and efficiently manufactured and marketed.

It is a further object of the present invention to provide a new and improved liquid fertilizer dispenser which is of a durable and reliable construction.

An even further object of the present invention is to provide a new and improved liquid fertilizer dispenser which is susceptible of a low cost of manufacture with regard to both materials and labor, and which accordingly is then susceptible of low prices of sale to the consuming public, thereby making such dispensers economically available to the buying public.

Still another object of the present invention is to provide a new and improved liquid fertilizer dispenser designed for use by the average homeowner or gardener.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
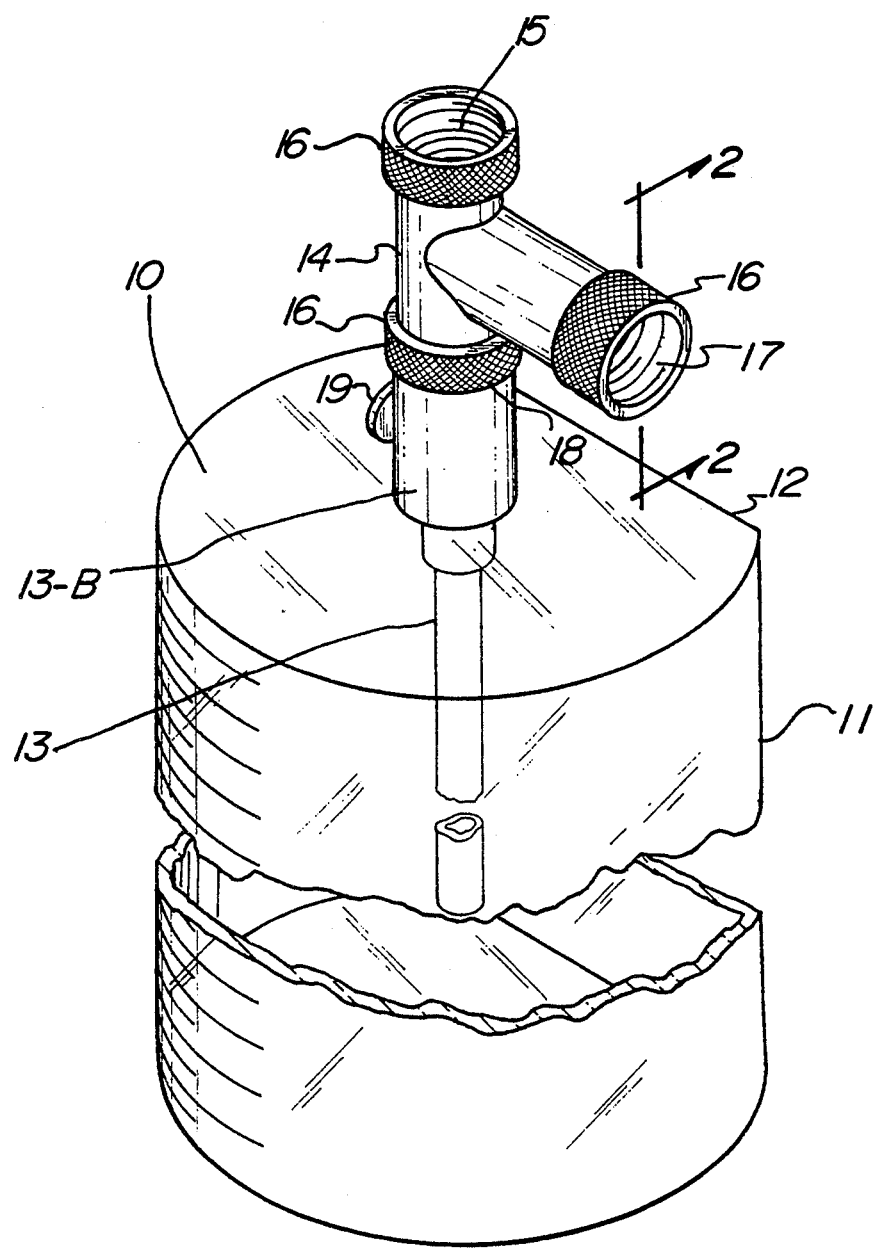
FIG. 1 is a perspective view of the simplest form of the present invention.

With reference now to the drawings, and in particular to FIG. 1 thereof, a new and improved liquid fertilizer dispenser embodying the principles and concepts of the present invention and generally designated by the reference numeral 10 will be described.

Figure 2:
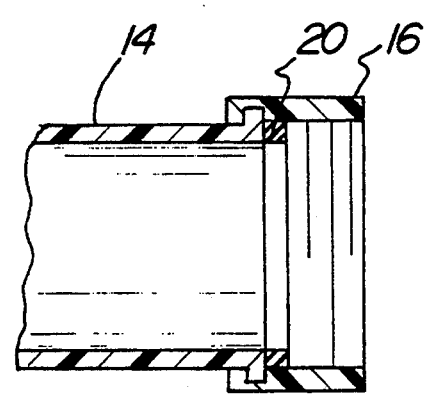
FIG. 2 is a sectional view on line 2—2 of FIG. 1.

More specifically, it will be noted that the dispenser 10 utilizes a rigid, preferably semi-cylindrical container 11 having a straight side 12 and formed of plastic, adapted to contain a solution of fertilizer and water. Extending up from the interior of container 11 is a feeder tube 13. As it exits the top of container 11, tube 13 enters the base 18 of a "T-fitting" 14. The T-fitting 14 has an entrance end 15 with a threaded collar 16 adapted to engage with and fasten to a conventional outside water faucet (not shown). The exit end 17 of T-fitting 14 has a similar threaded collar 16 of a size to accept and secure to a conventional water hose (not shown) such as is used in the usual yard watering. The tube 13 has an enlarged threaded end 13-B adapted to engage with the bottom end 18 of T-fitting 14 using a similar threaded collar 16, and such enlarged end 13-B has therein, a valve 19 which, when closed, closes off communication between tube 13 and the rest of T-fitting 14. In operation (after hooking the unit 10 to a water faucet), a stream of water is initiated by opening the faucet. Thereupon, valve 19 is cracked open allowing the vacuum created by the venturi effect of the moving stream of water to suck the liquid fertilizer solution up from the interior of container 11 via tube 13 whence it is injected into the stream of water and the mix of fertilizer and water is dispensed by nozzle or sprinkler or the like through the hose attached to outlet 17. As shown in FIG. 2 the threaded collar 16 is rotatable about the T-fitting 14 to engage with the threaded end of the conventional hose and is provided with a gasket 20 to prevent dripping at such connection.

Figure 3:
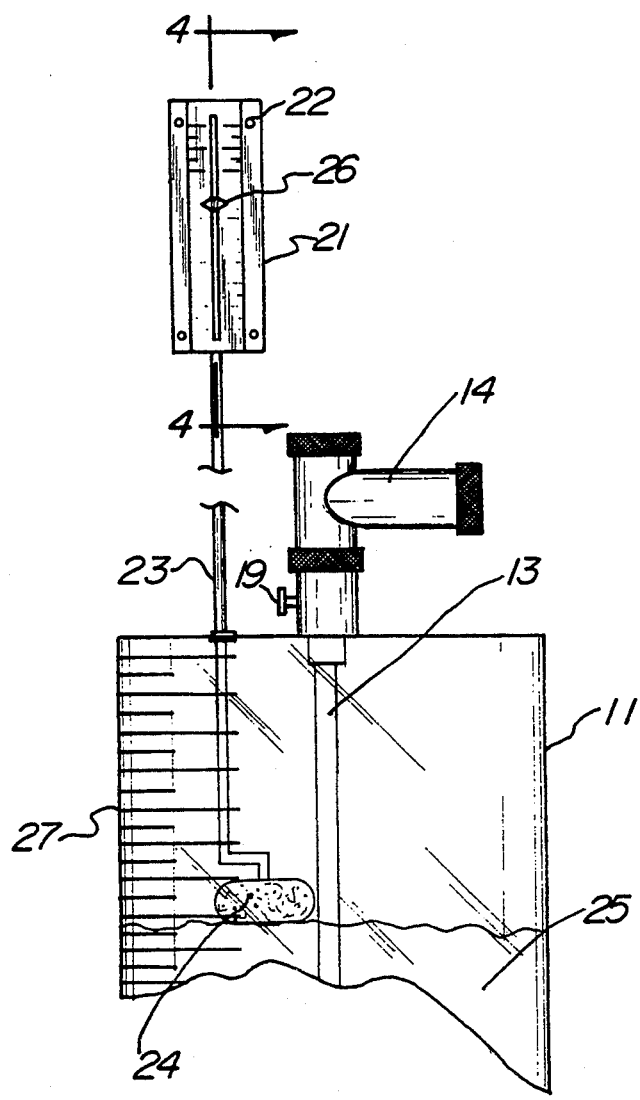
FIG. 3 is a side plan view of a preferred form of the present invention.

Preferably, as shown in FIG. 3, a level gauge 21 is provided to allow the user to observe the level of the liquid fertilizer in container 11 and to adjust the amount being dispensed to a desired degree using valve 19 as described above. Gauge 21 is adapted to be mounted on the wall adjacent the faucet being used by screws 22, and has a slidable arm 23 extending down from the gauge 21 into the top of container 11 wherein it terminates in a float member 24. As the level of the liquid fertilizer 25 drops in use, the rate of such decrease in level may be controlled by opening or closing valve 19 and observing the effect thereof on the indicator 26 affixed to the upper end of arm 23. Graduations 27 are preferably also marked on container 11 which is transparent but the gauge 21 provides a much easier way of observing the rate of fertilizer addition.

Figure 4:
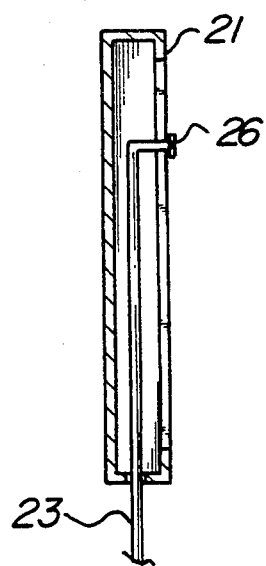
FIG. 4 is a partial sectional view on line 4—4 of FIG. 3.

FIG. 4 shows in a sectional view taken on line 4—4 of FIG. 3 the connection of indicator 26 to the upper end of arm 23 within gauge 21.

Figure 5:
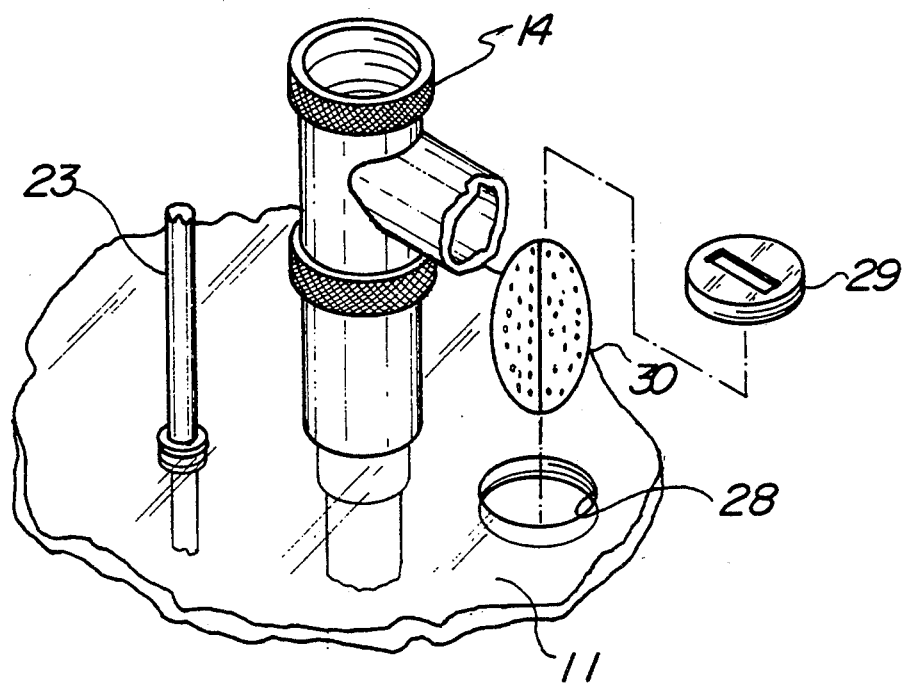
FIG. 5 is a partial perspective view showing a further preferred modification of the device in FIG. 3.
Figure 6:
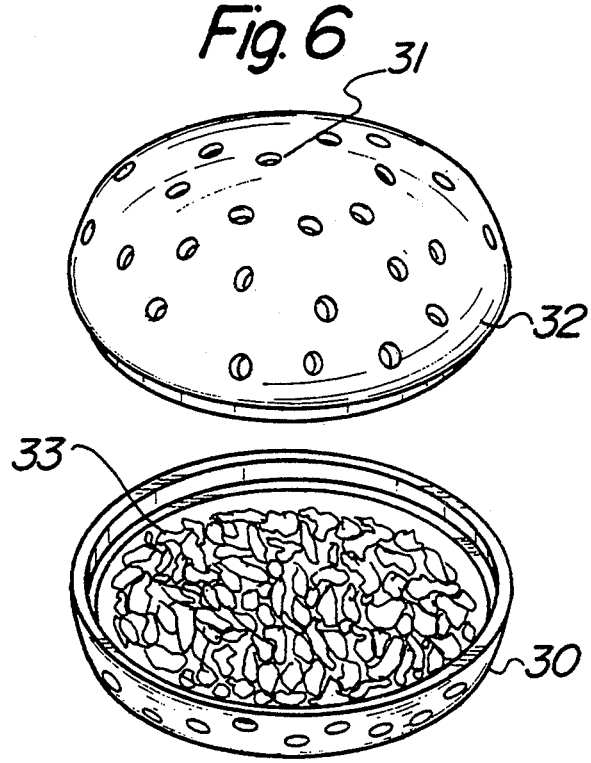
FIG. 6 is an exploded perspective view of a capsule which may be used with the present invention.

FIG. 5 shows another preferred addition to the unit shown in FIG. 3. This is an entry port 28, having a fluid tight closure cap 29 therefor, located on the top surface of container 11. Port 28 facilitates the addition of fertilizer solution to the interior of container 11 without requiring such container to be unthreaded from T-fitting 14 and also may be used to add more solid (granulated) fertilizer to container 11. Preferably such addition of fertilizer is done by using a perforated capsule 30 (shown in detail in FIG. 6).

The capsule 30 is formed of plastic having a plurality of perforations 31 therein and a removable, press-fit lid 32 to permit the enclosure of granulated fertilizer 33 therein. Upon being dropped into the liquid within container 11 the fertilizer 33 is dissolved by such liquid and mixes therewith via such perforations 31.

The flat straight wall 12 of container 11 is provided to permit the unit to fit up against the wall from which the water-supplying faucet protrudes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A liquid fertilizer dispensing device comprising:
   a semi-cylindrical, transparent container having a straight side, a top wall, and an interior, said straight side being operable to engage a surface to support said container adjacent said surface, said top wall having an entry port extending therethrough, said container being operable to contain a liquid fertilizer solution;
   a feeder tube extending from said interior of said container through said top wall exteriorly of said container;
   a valve coupled to said feeder tube and in fluid communication through said feeder tube with said interior of said container;
   a T-fitting having a base end in fluid communication with said feeder tube, an entrance end with an entrance threaded collar operable to engage and fasten to a conventional exterior water faucet, and an exit end with an exit threaded collar operable to engage and fasten to a conventional water hose, said T-fitting facilitating fluid flow from said entrance end to said exit end and past said feeder tube such that a venturi-effect vacuum is created to draw said liquid fertilizer solution from said container, whereby said liquid fertilizer solution is mixed with said fluid flow;

a closure cap removably coupled to said container for sealing said entry port; and a perforated capsule removably contained within said container, said capsule having a plurality of perforations therethrough and a removable, press-fit lid to permit the enclosure of granulated fertilizer within said capsule, such that said granulated fertilizer will mix with said solution upon being positioned through said entry port and into said container.

2. The liquid fertilizer dispensing device of claim 1, and further comprising graduation markings on said container for visually indicating a volume of said solution within said container.

3. The liquid fertilizer dispensing device of claim 2, and further comprising a level gauge for indicating a level of said solution within said container, said gauge being mountable to said surface adjacent said container, said gauge comprising a slidable arm extending through said top wall of said container, and a float coupled to said arm, said float being buoyant relative to said fluid such that said arm moves in accordance with said level of said solution in said container.

* * * * *